United States Patent [19]
Abramson et al.

[11] Patent Number: 5,694,553
[45] Date of Patent: Dec. 2, 1997

[54] METHOD AND APPARATUS FOR DETERMINING THE DISPATCH READINESS OF BUFFERED LOAD OPERATIONS IN A PROCESSOR

[75] Inventors: Jeffrey M. Abramson, Aloha; Kris G. Konigsfeld, Portland, both of Oreg.

[73] Assignee: Intel Corporation, Santa Clara, Calif.

[21] Appl. No.: 508,233

[22] Filed: Jul. 27, 1995

Related U.S. Application Data

[63] Continuation-in-part of Ser. No. 177,164, Jan. 4, 1994.

[51] Int. Cl.⁶ .............................. G06F 12/00; G06F 9/30
[52] U.S. Cl. ............................................................ 395/250
[58] Field of Search ..................... 364/DIG. 1 MS File, 364/DIG. 2 MS File; 395/427, 444, 445, 452, 460, 376, 392, 393, 250

[56] References Cited

U.S. PATENT DOCUMENTS

| | | | |
|---|---|---|---|
| 5,191,649 | 3/1993 | Cadambi et al. | 395/200.05 |
| 5,261,071 | 11/1993 | Lyon | 395/467 |
| 5,280,615 | 1/1994 | Church et al. | 395/674 |
| 5,420,990 | 5/1995 | McKeen et al. | 395/392 |
| 5,420,991 | 5/1995 | Konigsfeld et al. | 395/477 |
| 5,467,473 | 11/1995 | Kahle et al. | 395/800 |
| 5,588,126 | 12/1996 | Abramson et al. | 395/376 |
| 5,606,670 | 2/1997 | Abramson et al. | 395/250 |

OTHER PUBLICATIONS

Johnson, Mike; *Superscalar Microprocessor Design;* Prentice Hall, Inc., New Jersey, 1991.

*Primary Examiner*—Robert B. Harrell
*Attorney, Agent, or Firm*—Blakeley, Sokoloff, Taylor & Zafman

[57] ABSTRACT

The present invention provides a buffer management scheme for load operations that permits load operations to be stored for execution to memory. The buffer management scheme of the present invention calculates the readiness of multiple buffered load operations to speed up dispatch of at least one of the load operations to memory. By providing such management, the present invention allows memory operations and their execution by a device, such as a processor, to be coordinated with the operation of the system and other operations in the processor.

8 Claims, 13 Drawing Sheets

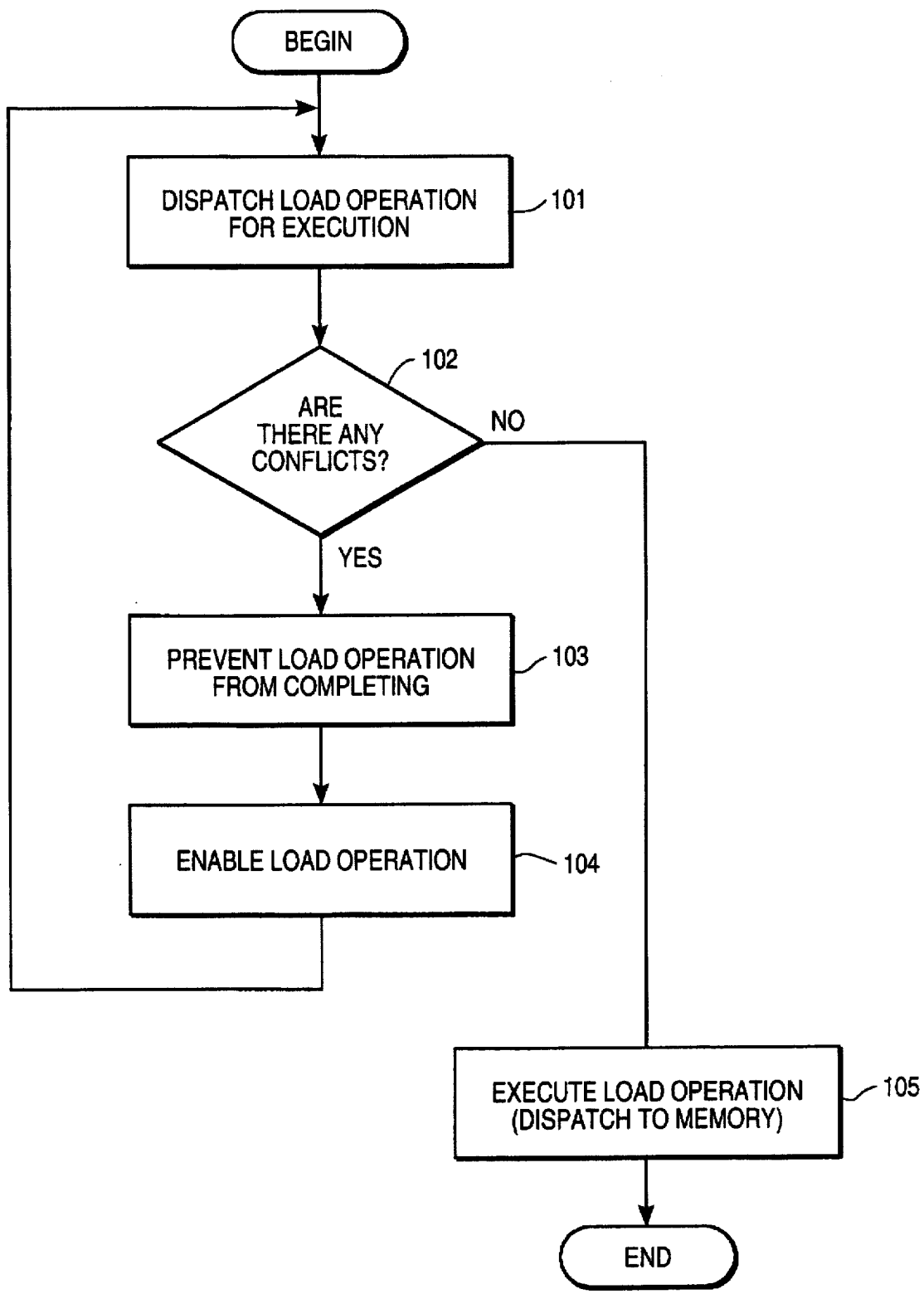
FIG_1

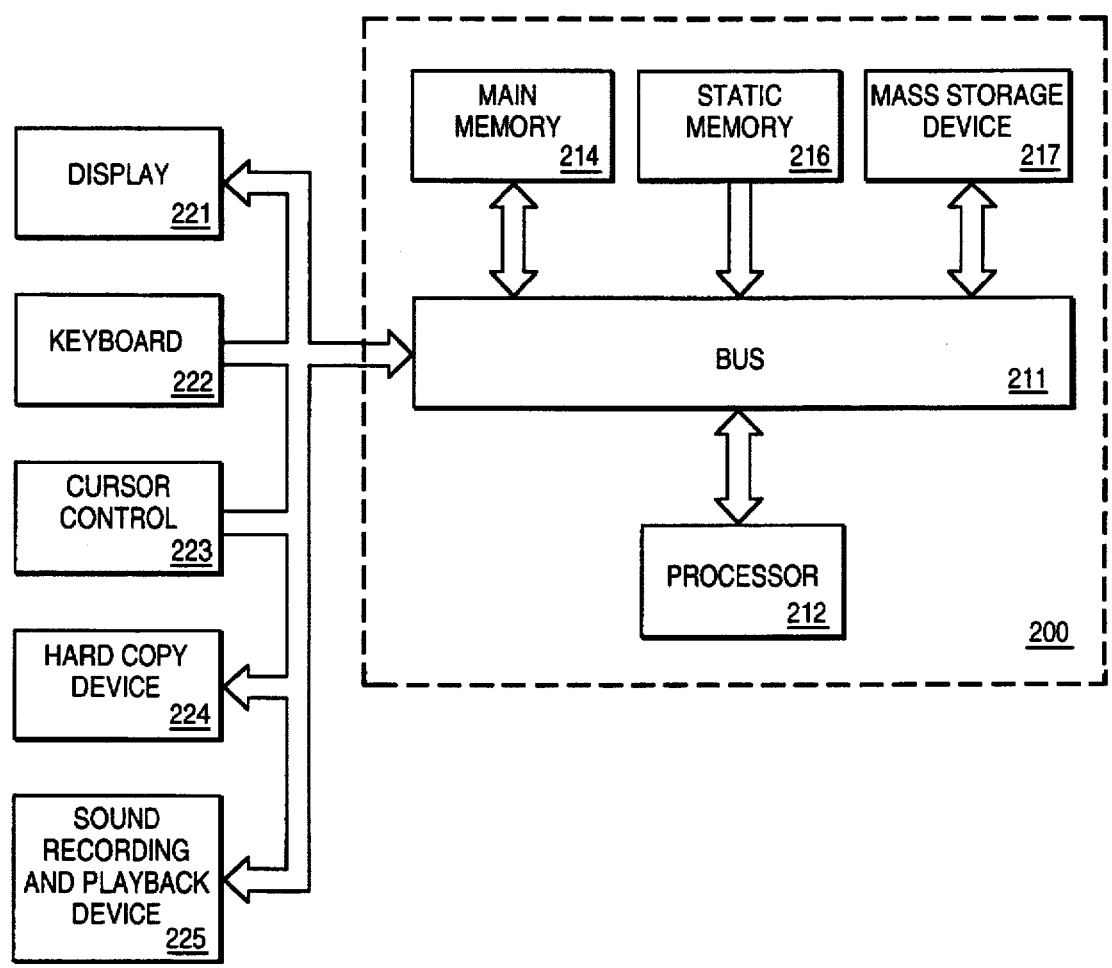
FIG_2A

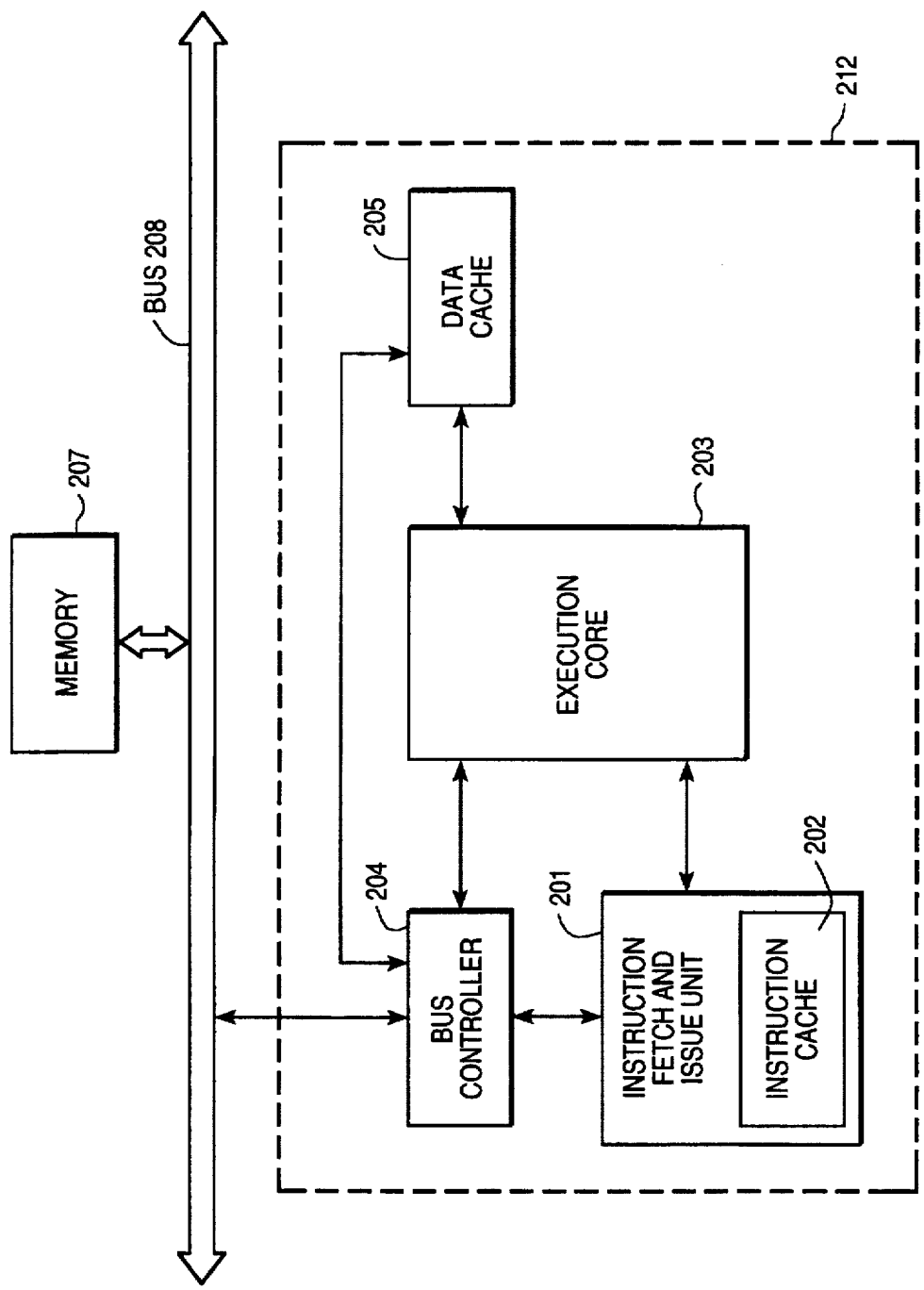

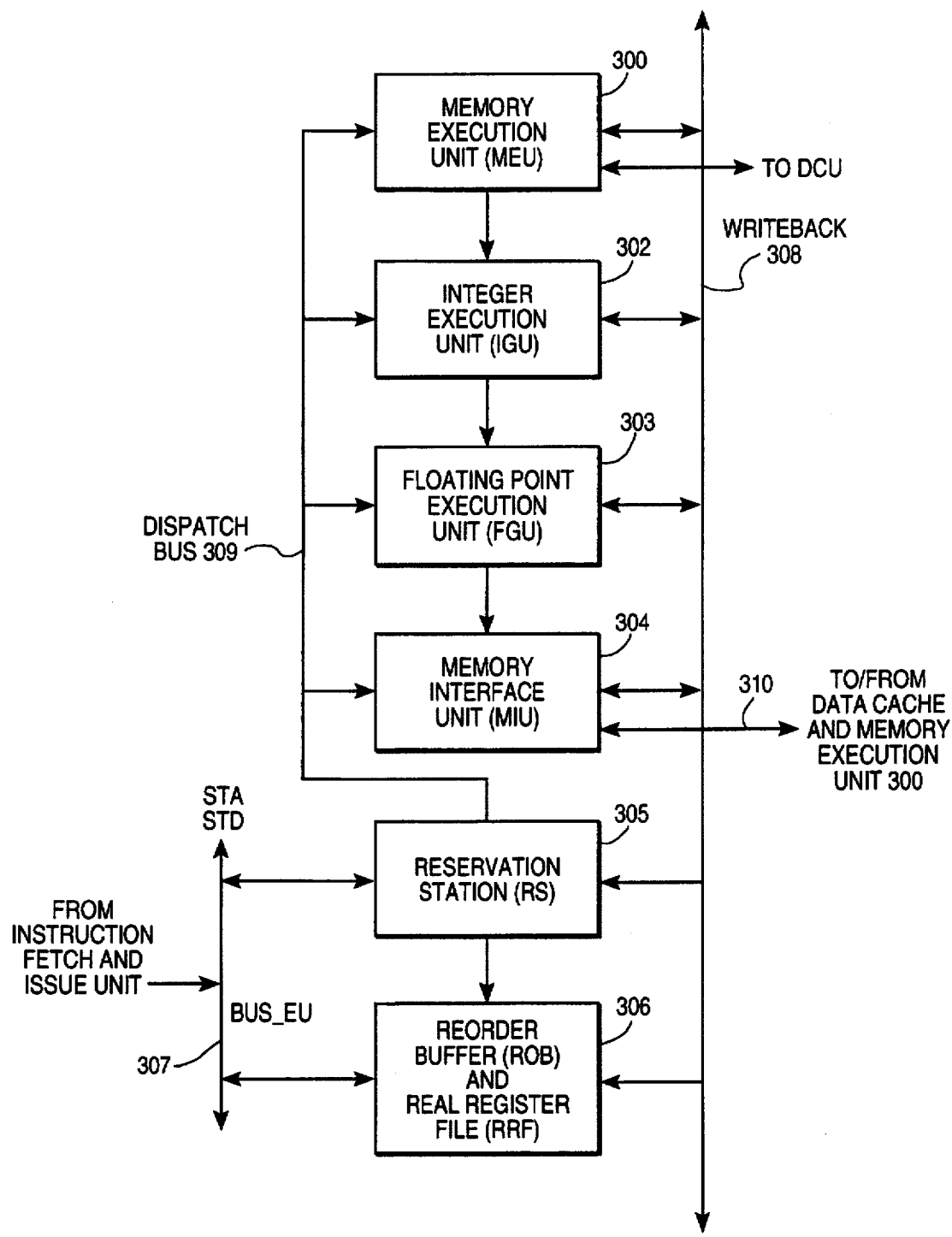
FIG_3

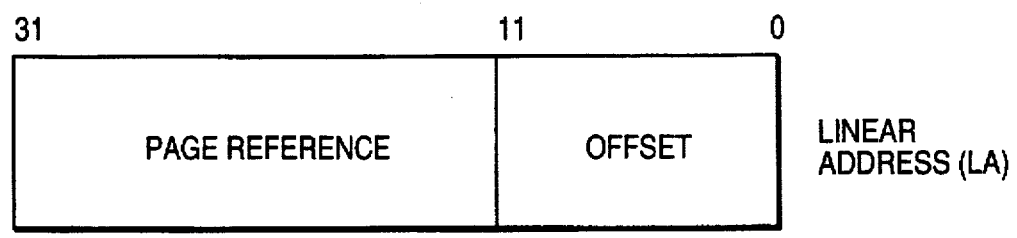
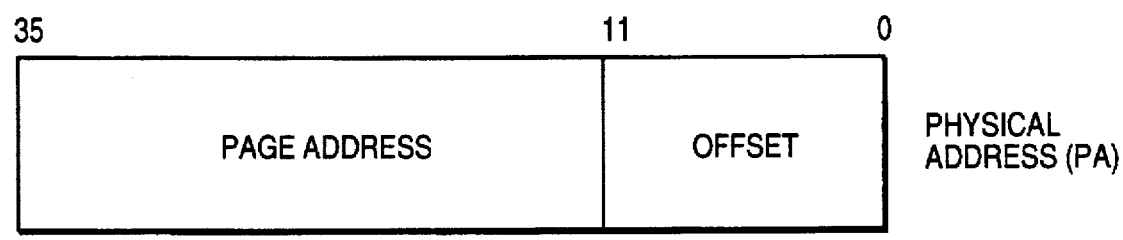
FIG_4

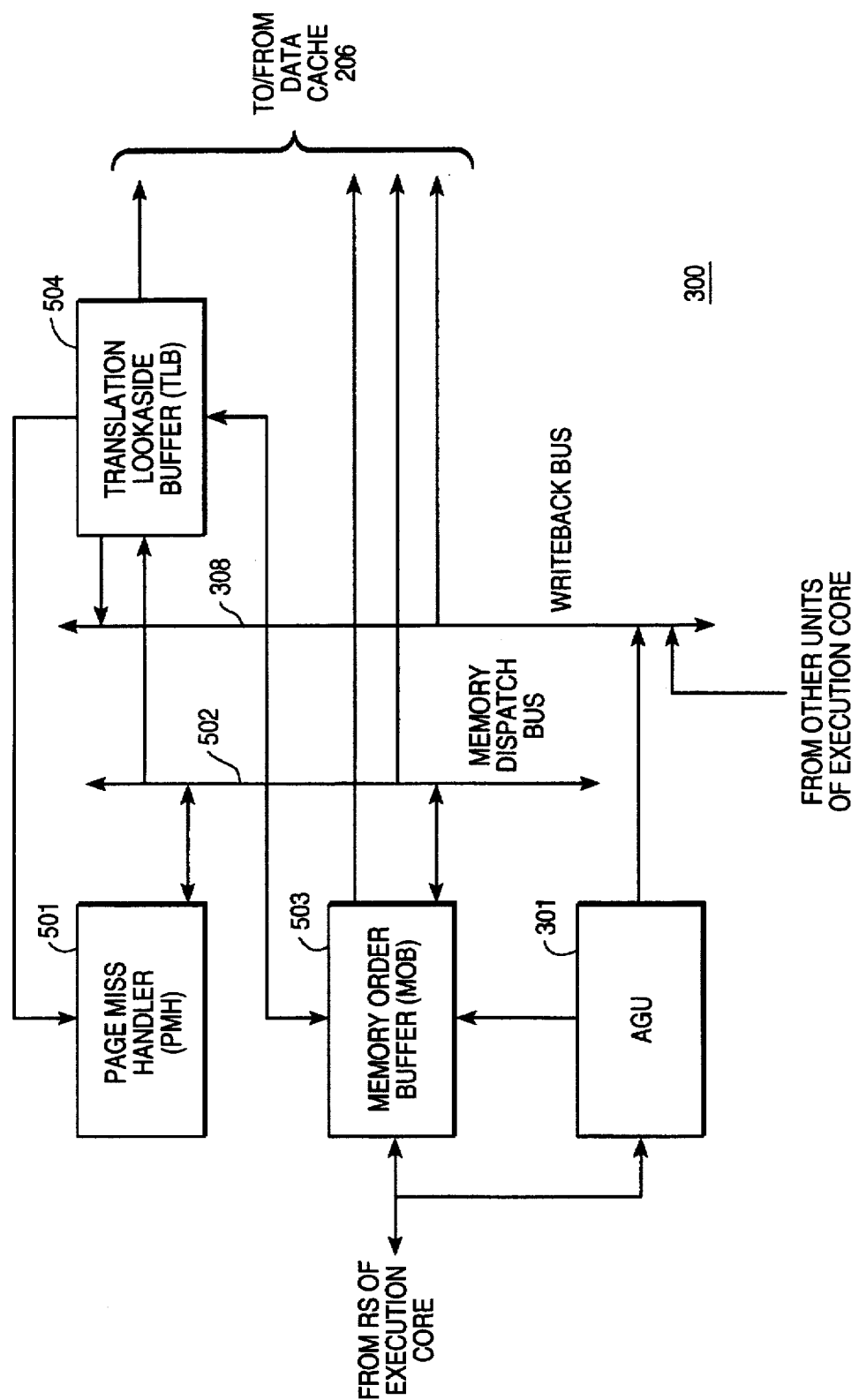
FIG_5

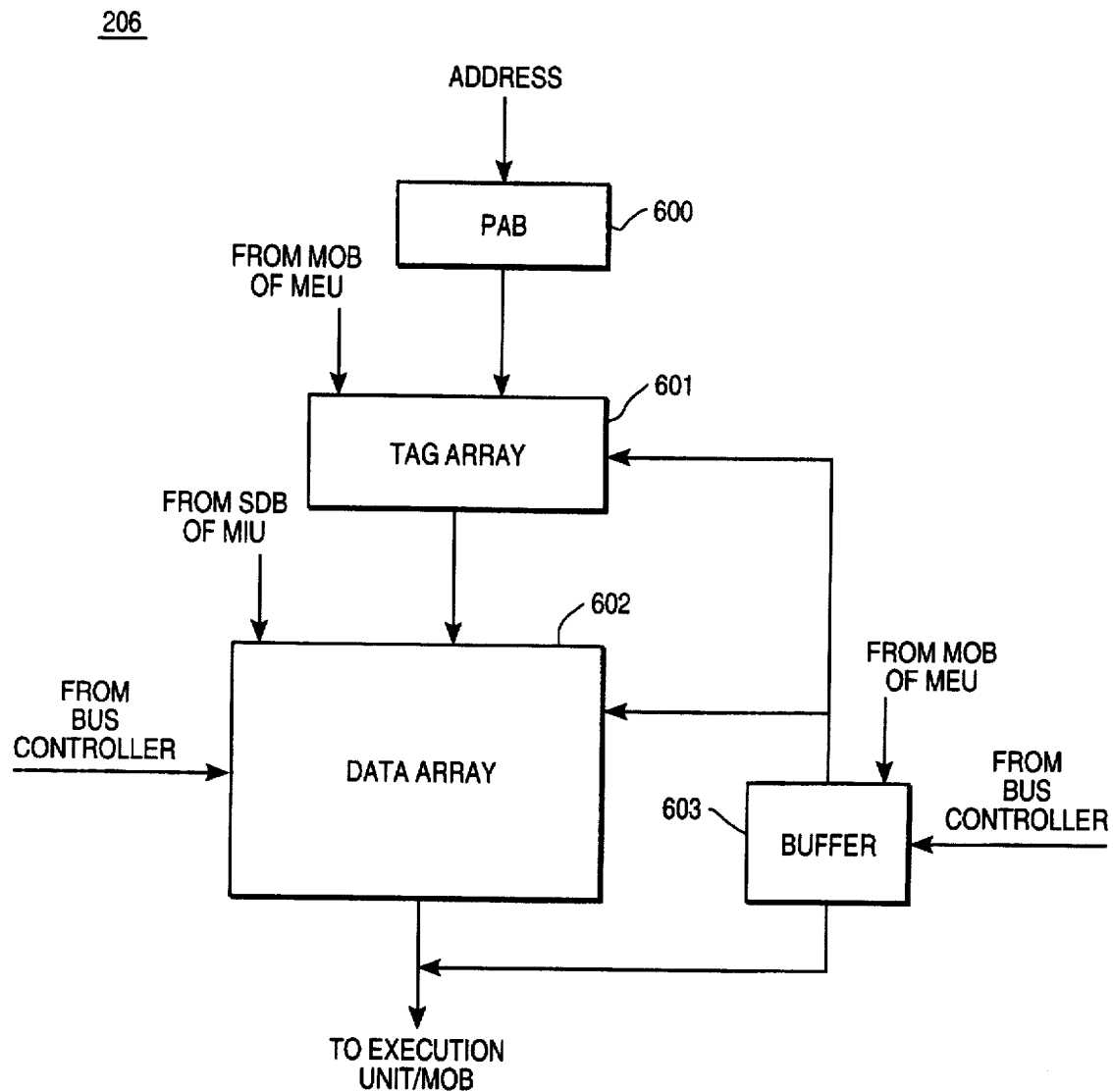
FIG_6

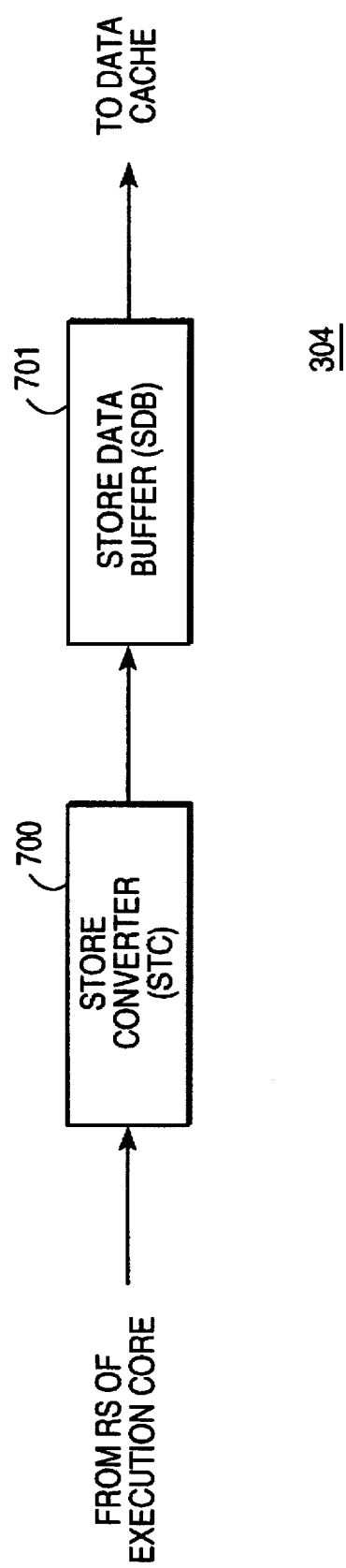

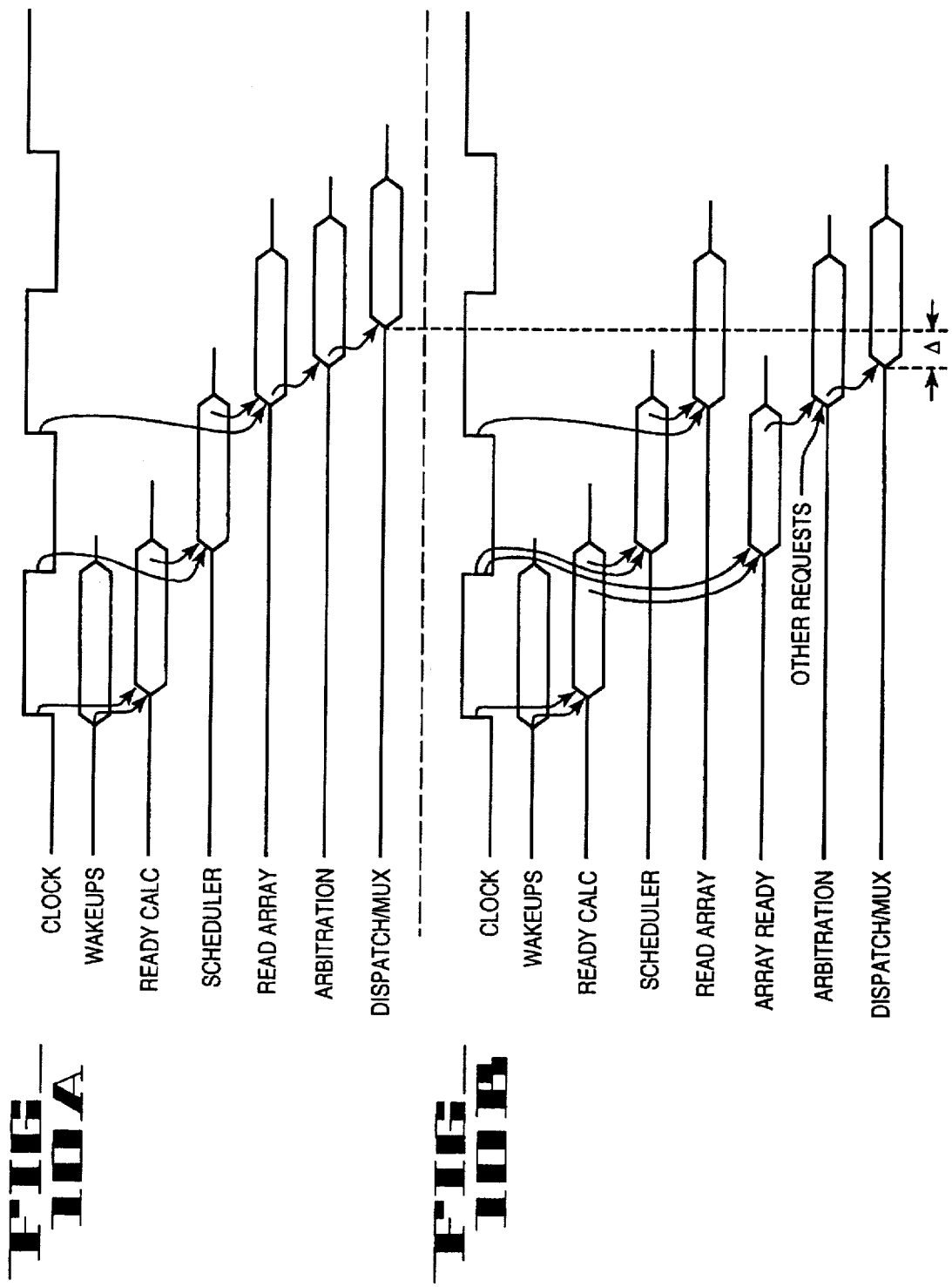

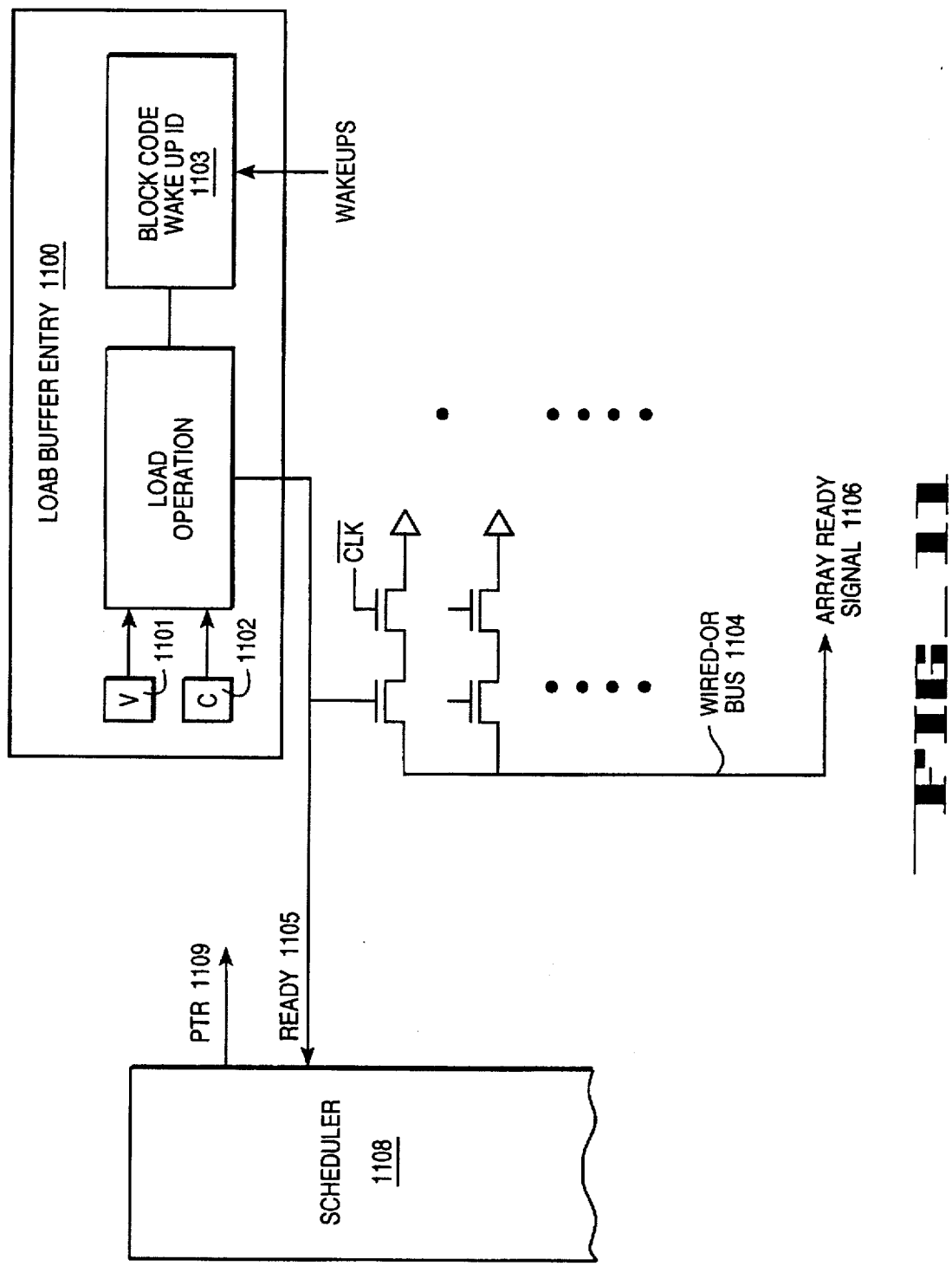
FIG_11

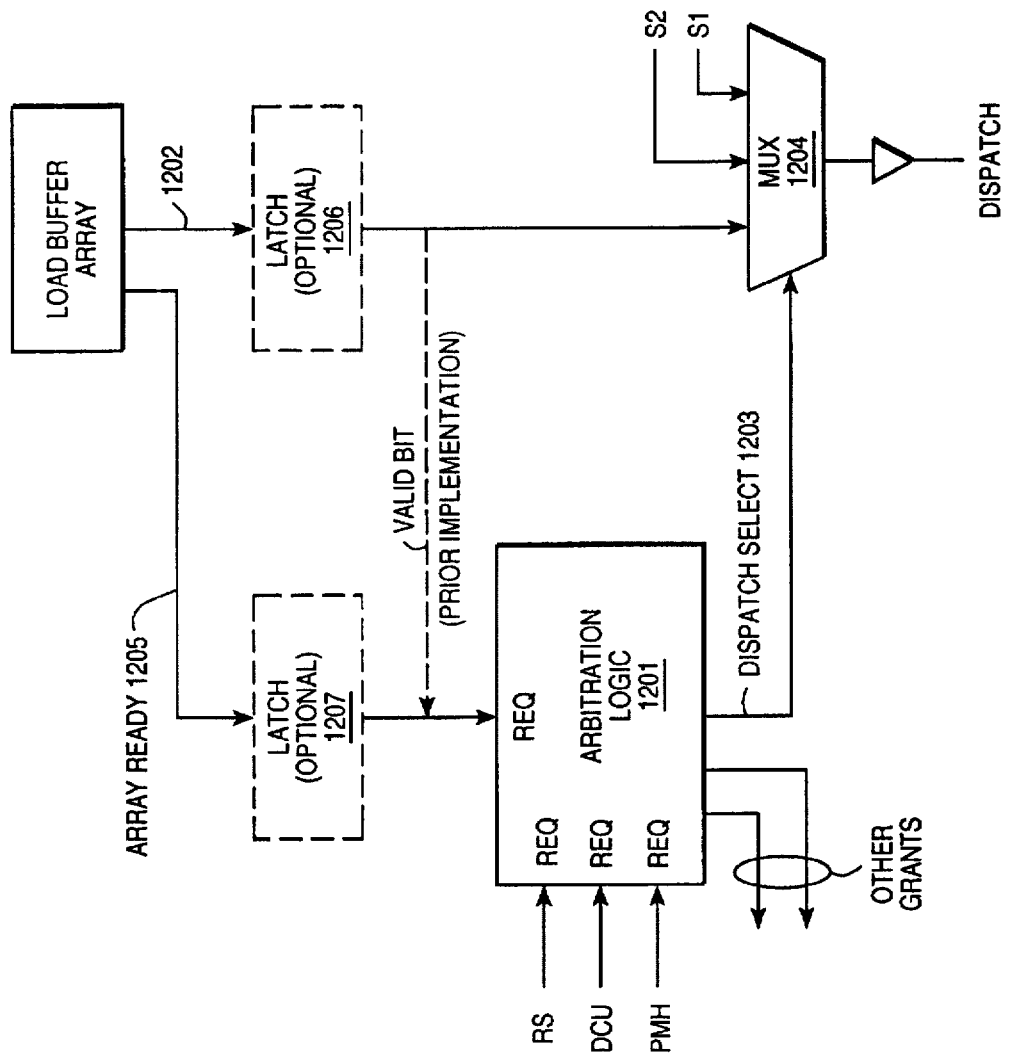
FIG_12

METHOD AND APPARATUS FOR DETERMINING THE DISPATCH READINESS OF BUFFERED LOAD OPERATIONS IN A PROCESSOR

This is a continuation-in-part of U.S. patent application Ser. No. 08/177,164, entitled "Method and Apparatus for Performing Load Operations in a Computer System, filed Jan. 4, 1994, and assigned to the corporate assignee of the present invention.

FIELD OF THE INVENTION

The present invention relates to the field of computer systems; more particularly, the present invention relates to performing load operations in a computer system when load operations are buffered in a processor and their readiness for dispatch into the remainder of the computer system.

BACKGROUND OF THE INVENTION

A computer system may be divided into three basic blocks: a central processing unit (CPU), memory, and input/output (I/O) units. These blocks are coupled to each other by a bus. An input device, such as a keyboard, mouse, stylus, analog-to-digital converter, etc., is used to input instructions and data into the computer system via an I/O unit. These instructions and data can be stored in memory. The CPU receives the data stored in the memory and processes the data as directed by a set of instructions. The results can be stored back into memory or outputted via the I/O unit to an output device, such as a printer, cathode-ray tube (CRT) display, digital-to-analog converter, etc.

The CPU receives data from memory as a result of performing load operations. Each load operation is typically initiated in response to a load instruction. The load instruction specifies an address to the location in memory at which the desired data is stored. The load instruction also usually specifies the amount of data that is desired. Using the address and the amount of data specified, the memory may be accessed and the desired data obtained.

Some computer systems have the capabilities to execute instructions out-of-order. In other words, the CPU in the computer system is capable of executing one instruction before a previously issued instruction. This out-of-order execution is permitted because there was no dependency between the two instructions. That is, the subsequently issued instruction does not rely on a previously issued unexecuted instruction for its resulting data or its implemented result. The CPU may also be capable of executing instructions speculatively, wherein conditional branch instructions may cause certain instructions to be fetched and issued based on a prediction of the condition. Therefore, depending on whether the CPU predicted correctly, the CPU will be either executing the correct instructions or not. Branch prediction and is relationship with speculative execution of instructions is well-known in the art. For a detailed explanation of speculative out-of-order execution, see M. Johnson, *Superscalor Microprocessor Design*, Prentice Hall, 1991. Speculative and out-of-order execution offer advantages over the prior art, including better use of resources.

However, memory operations typically must be executed in order to maintain memory consistency, especially when their execution would create incorrect results.

If multiple load operations may be executed at the same time, yet memory ordering still is being observed, the execution and retirement of memory operations must be managed. Such management of load operations typically controls when load operations are dispatched to memory. A load operation may be dispatched to memory when it is ready for dispatch and the resources required to perform the dispatching operation are determined to be available. The time expended in dispatching a load operation may be longer than desired. The length of time to dispatch a load is based on the interdependencies on these functions being performed to dispatch the load operations. The interdependencies that are on the critical path contribute to the overall length of time necessary to complete the dispatch of a load operation. It is desirable to remove critical path functions in order to reduce the overall time necessary to dispatch a load operation.

The present invention provides for reducing the time necessary to dispatch a load operation.

SUMMARY OF THE INVENTION

The present invention provides an apparatus for use in a system, that includes a bus, an issue unit, an array and an array management mechanism. The issue unit issues operations including load operations in response to instructions. The array has entries to store a predetermined number of load operations that are issued from the issue unit. The array stores the load operations prior to dispatch to memory for their execution. The array management mechanism determines dispatch readiness of load operations stored in the array by performing an operation that indicates the readiness of load operations. Using the results of this operation, the array management mechanism reduces the time required to indicate whether a load operation in the array is ready for dispatch, thereby reducing the time required to dispatch a load operation. In one embodiment, the present invention performs a logical ORing of ready functions to generate an array ready signal that is used in determining whether a load operation stored in the array is ready for dispatch.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1 is a flow diagram illustrating the process of the present invention.

FIG. 2A is a block diagram of the computer system of the present invention.

FIG. 2B is a block diagram of the memory subsystem of the present invention.

FIG. 3 is a block diagram of one embodiment of the execution unit of the present invention.

FIG. 4 illustrates an example of one embodiment of the addressing scheme of the present invention.

FIG. 5 is a block diagram of the relevant portions of the cache controller of the present invention.

FIG. 6 is a block diagram of the relevant portions of the data cache of the present invention.

FIG. 7 is a block diagram of the relevant portions of memory interface unit of the present invention.

FIGS. 10A and 10B are timing diagrams illustrating the dispatching process of a prior implementation and the present invention.

FIG. 11 illustrates the generation of the array ready signal according to the present invention.

FIG. 12 is one embodiment of the dispatching hardware of the present invention.

DETAILED DESCRIPTION OF THE PRESENT INVENTION

Figure 8:
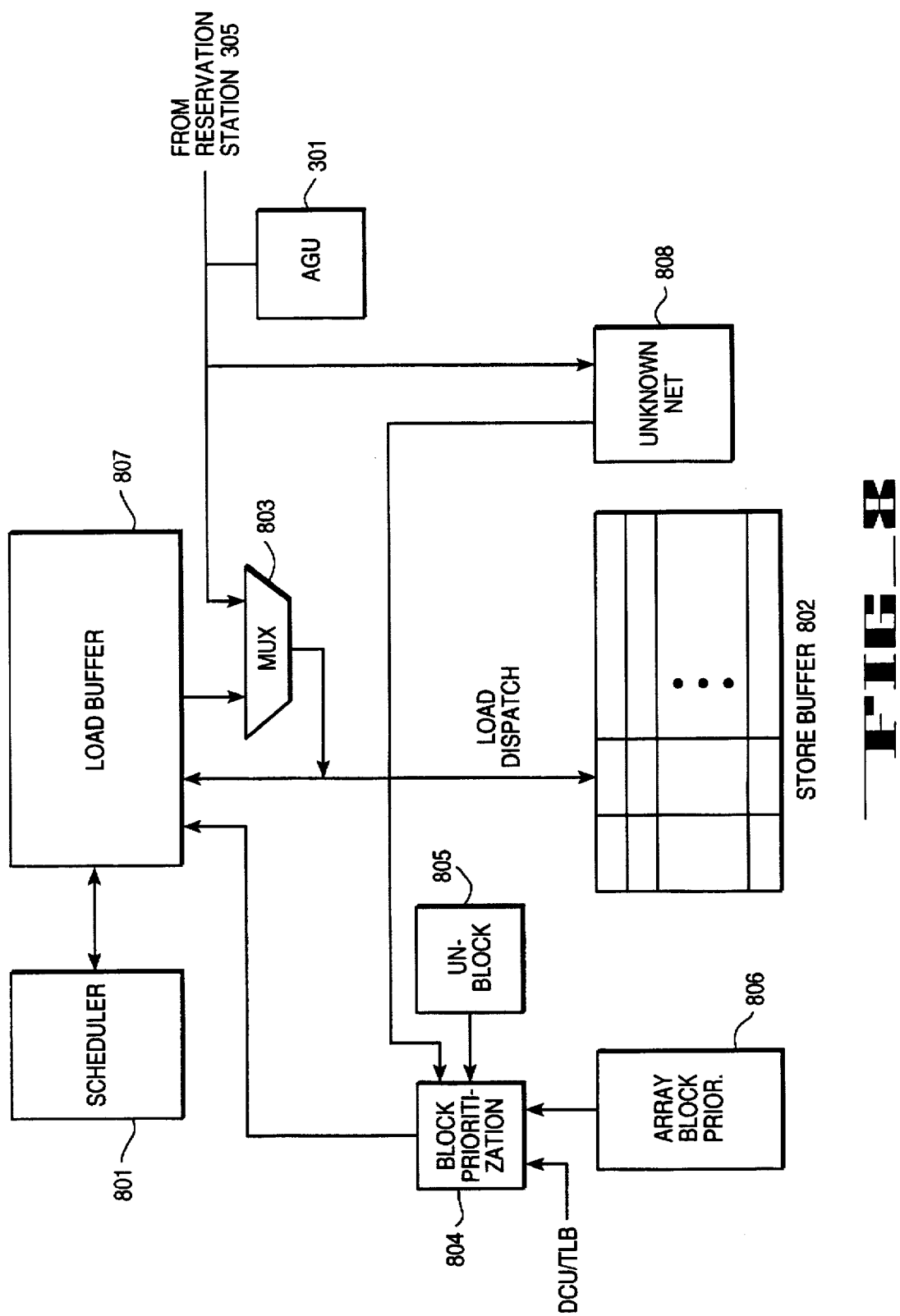
FIG. 8 is a block diagram of the relevant portions of the memory order system of the present invention.

An apparatus for executing load operations is described. In the following detailed description of the present invention numerous specific details are set forth, such as specific number of bits, address sizes, numbers of entries, etc., in order to provide a thorough understanding of the present invention. However, it will be apparent to one skilled in the art that the present invention may be practiced without these specific details. In other instances, well-known structures and devices are shown in block diagram form, rather than in detail, so as not to obscure the present invention. In the present invention, the dispatching of a load operation, that has been stored due to a conflict, involves generating an array ready signal, to indicate the validity of one or more stored load operations. This is described in more detail below.

Overview of the Execution of Load Operations

The present invention performs the load operations in response to load instructions executed in the computer system. The load instructions are received and executed by a processor in the computer system. In performing the load operations, the present invention insures that there are no memory ordering violations, even though these operations may be performed out-of-order.

The process for performing a load operation in the present invention is depicted in the flow diagram of FIG. 1. Referring to FIG. 1, the load operation is initially dispatched into the memory subsystem for execution in the computer system (processing block 101). In the present invention, this dispatch occurs when there are no data dependencies on the load operation. A test then determines whether there are any conflicts (other than data depending conflicts) that might exist between the load operation and previously dispatched store operations which could possibly result in incorrect data being loaded into the processor as a result of the execution of the load (processing block 102). The present invention provides several mechanisms for detecting when conflicts arise, such that speculative execution may be used as much as possible. In the present invention, these conflicts may be due to address dependencies where the source address of the load operation may be the same as a distinction address of one of the currently dispatched, yet not completed, store operations. The present invention is able to track address dependencies between load and store operations by assigning an identification to each load operation to identify its relative temporal position with respect to the sequential stream of store operations. Using the identification, the present invention identifies the set of store operations, if any, that potentially conflict with the load operation. The present invention also identifies conflicts due to resource dependencies. Resource dependencies exist when a resource required for execution of the load operation is currently in use or unavailable for one of a number of reasons, such that the load operation cannot gain control of the resource for its execution.

If the present invention identifies either such a conflict or condition (e.g., a resource or address dependency), then processing continues at processing block 103, where the load is temporarily prevented, or "blocked", from completion for a predetermined period of time (e.g., the current cycle). The load operation is enabled, or "awakened" when the conditions or conflicts that resulted in the block are no longer in existence (processing block 104) and processing continues at processing block 101 when the process is repeated. If the present invention does not identify any conflicts, then processing also continues at processing block 105. At processing block 105, the load operation is dispatched to memory to retrieve the desired data after which the load operation may be retired (committed to processor state). In the present invention, the dispatching of a load operation, which has been stored due to a conflict, involves generating an array ready signal to indicate the validity of one or more stored load operations. This is described in more detail below.

Overview of the Computer System of the Present Invention

Referring to FIG. 2A, the computer system upon which one embodiment of the present invention is implemented is shown as 200. Computer system 200 comprises a bus or other communication means 211 for communicating information, and a processor 212 coupled with bus 211 for processing information. Processor 212 includes, but is not limited to microprocessors such as an Intel Architecture Microprocessor, manufactured by, for instance, Intel Corporation of Santa Clara, Calif., the corporate assignee of the present invention. Processor 212 may also be another microprocessor, compatible or otherwise, such as the PowerPC™, Alpha™, etc.

System 200 further comprises a random access memory (RAM) or other dynamic storage device 214 (referred to as main memory), coupled to bus 211 for storing information and instructions to be executed by processor 212. Main memory 214 also may be used for storing temporary variables or other intermediate information during execution of instructions by processor 212. Computer system 200 also comprises a read only memory (ROM) and/or other static storage device 216 coupled to bus 211 for storing static information and instructions for processor 212, and a data storage device 217 such as a magnetic disk or optical disk and its corresponding disk drive. Data storage device 217 is coupled to bus 211 for storing information and instructions.

Computer system 200 may further be coupled to a display device 221, such as a cathode ray tube (CRT) or liquid crystal display (LCD) coupled to bus 211 for displaying information to a computer user. An alphanumeric input device 222, including alphanumeric and other keys, may also be coupled to bus 211 for communicating information and command selections to processor 212. An additional user input device is cursor control 223, such as a mouse, a trackball, stylus, or cursor direction keys, coupled to bus 211 for communicating direction information and command selections to processor 212, and for controlling cursor movement on display 211. Another device which may be coupled to bus 211 is hard copy device 224 which may be used for printing instructions, data, or other information on a medium such as paper, film, or similar types of media. Furthermore, a sound recording and playback device, such as a speaker and microphone may optionally be coupled to bus 211 for interfacing with computer system 200. Note that any or all of the components of system 200 and associated hardware may be used in a preferred embodiment, however, it can be appreciated that any type of configuration of the system may be used for various purposes as the user requires.

FIG. 2B is a block diagram of processor 212 of the computer system of the present invention. Referring to FIG. 2B, a block diagram illustrating an exemplary processor 200 incorporating the teachings of the present invention is shown. The exemplary processor 200 comprises an execution unit 201, a bus controller 202, a data cache controller 203, a data cache 204, and an instruction fetch and issue unit 205 with an integrated instruction cache 206. The elements 201–206 are coupled to each other as illustrated. Together they cooperate to fetch, issue, execute, and save execution results of instructions in a pipelined manner.

The instruction fetch and issue unit 205 fetches instructions from an external memory through the bus controller 202 via an external system bus. Bus controller 202 manages transfers of data between external components and processor 200. In addition, it also manages cache coherency transfers. The instruction fetch and issue unit 205 then issues these instructions to the execution unit 201 in an in-order sequence. Basically, the execution unit 201 performs such functions as add, subtract, logical AND, and integer multiply. Some of these instructions are fetched and dispatched speculatively. The execution unit 201 holds and executes the integer and floating point instructions when their operand dependencies on execution results of preceding instructions are resolved. In similar fashion, the execution unit 201 holds and forwards the load and store instructions to the memory ordering buffer 208.

Retirement logic 207 commits the states of these instructions to whatever permanent architectural state that was designated by the original source code. Within memory ordering buffer 208, loads and stores are checked for memory ordering effects. Stores and/or loads are potentially postponed until ordering inconsistencies are resolved.

The memory ordering buffer 208 is comprised of store buffer 209 and load buffer 210. Store buffer 209 is a first-in-first-out (FIFO) structure for storing address, size, data, and other key attributes. The top pointer of the structure points to the store most recently retired. The bottom of store buffer 209 (i.e., the one containing the oldest retired store) is the one ready to be written to a memory subsystem, such as data cache 204. The store buffer 208 is only visible to the processor core (e.g., execution unit 101 and instruction fetch and issue unit 205).

The load buffer 210 is a scratchpad buffer used by the memory subsystem to impose access ordering on memory loads. Each load operation is tagged with the Store Buffer ID (SBID) of the store previous to it. This SBID represents the relative location of the load operation compared to all stores in the execution sequence. When a load operation executes in the memory, its SBID is used as a beginning point for analyzing the load operation against all older store operations in the buffer.

Data cache controller 203 controls the access of data to/from the data cache 204. Data cache 204 is a fast, small, hardware-maintained scratchpad memory which can be reached in fewer clock cycles than main memory by loads and stores. The data cache controller 203 and the data cache 204 respond to the load instructions immediately, forwarding data if necessary. In contrast, store instructions are buffered. In other words, instructions are not necessarily executed/forwarded in the order they were issued. Moreover, some instructions are speculatively executed/ forwarded. In any case, the execution results of the integer, floating point, and load instructions are buffered, and then retired or committed in order. In comparison, the buffered store instructions are retired or committed in order and then dispatched in the "background," at the convenience of the memory system. Speculative integer, floating point, and load execution results and buffered stores of mis-predicted branches are purged.

The instruction fetch and execution unit 205 is intended to represent a broad category of instruction fetching and issuing elements found in many computer systems. Their constitutions and functions are well known. In the presently preferred embodiment, the instruction fetch and issue unit 205 includes an instruction cache 206. The instruction cache 206 is a fast local memory that holds the instructions to be executed. When a program attempts to access an instruction that is not yet or no longer in the cache, the processor waits until hardware fetches the desired instructions from another cache or memory downstream. It is the responsibility of the instruction fetch and issue unit 205 to decide which instruction cache entry ought to be accessed next for maximal program performance. In the currently preferred embodiment, the instruction cache 206 and data cache 204 exists in a memory hierarchy.

FIG. 3 is a block diagram of one embodiment of the execution core of the present invention. Referring to FIG. 3, unit 201 comprises a reservation station (RS) 305, a memory execution unit (MEU) 300, an integer execution unit (IEU) 302, a floating point execution unit (FEU) 303, a memory interface unit (MIU) 304, a reorder buffer (ROB) and real register file (RRF) 306. Additionally, execution core 203 includes an internal bus (Bus_EU) 307 and a writeback bus 308. MEU 300, IEU 302, FEU 303 and MIU 304 are all coupled to reservation station 305 via a dispatch bus 309. They are also coupled to writeback bus 308. MIU 304 is also coupled to the data cache memory and MEU 300 via bus 310. RS 305 is coupled to the writeback bus 308 and the Bus_EU 307. RS 305 is also coupled to ROB and RRF 306. ROB and RRF 306 is also coupled to the Bus_EU 307 and the writeback bus 308. Together, elements 300–310 are coupled to hold, dispatch, execute and commit execution results of instructions, whereas described earlier, the dispatching and execution of instructions are not necessarily in the order the instructions are issued. That is, the instructions could be dispatched and executed out-of-order. Execution core 203 may include multiple IEUs, such as two or more IEUs.

Reservation station 305 receives and stores the issued instructions resolving their operands with data from the IEU 302, the FEU 303, the data cache memory, the ROB and RRF 306 and holds them until their operands are all resolved. The RS 305 then dispatches the issued instructions to the AGU (described below), the IEU 302, the FEU 303 and the MIU 304 and the MEU 300 as appropriate.

In particular, the load instruction is dispatched as a single operation, whereas the store instruction is dispatched as store address (STA) and stored data (STD) operations to the MEU 300 and MIU 304. Similar to instruction fetching, there is no requirement that the load sources or the store destinations be aligned to memory locations. In other words, the load sources of load instructions and store destinations of store instructions may span two cache lines (or two pages).

The MEU 300, the IEU 302, FEU 303, and the MIU 304, in turn, perform their operations accordingly. The execution results of the integer, floating point and load instructions are held in the ROB 306, and then committed by RRF 306 in the order these instructions were issued. Speculative execution results of the mispredicted branches are not committed, but instead are held in the ROB 306 and purged upon their detections.

FIG. 5 depicts a block diagram of the relevant portions of one embodiment of the memory execution unit (MEU) of the present invention. Referring to FIG. 5, the MEU 205 includes AGU 505, page miss handler 501, memory order buffer (MOB) 503, and translation lookaside buffer (TLB) 504, as well as memory dispatch 502 and the writeback bus 308. PMH 501 is coupled to the memory dispatch bus 502, writeback bus 308, and TLB 504. MOB 503 is coupled to the reservation station, memory dispatch bus 502, writeback bus 308, the data cache memory and TLB 504. TLB 504 is also coupled to memory dispatch bus 502, writeback bus 308 and the data cache memory 206. Memory dispatch bus 502 and writeback bus 308 are also coupled to the data cache memory 206. AGU 505 is coupled to MOB 503, the writeback bus 308, and the dispatch bus 309.

The AGU 505, MOB 503, PMH 501, and TLB 504 control all load accesses to the data cache memory and, in turn, the memory of the computer system. The AGU 505, MOB 503, PMH 501, and TLB 504 also execute the STA portion of the store. Specifically, MOB 503 buffers the results of the STA execution for the eventual store dispatch to the data cache memory.

The AGU 505 generates the appropriate linear address for the memory operations. The AGU 505 computes the linear address using a base address, a displacement value, a scale value, an index value and a segment value. In one embodiment, the linear address is 32-bits long with a 20 higher order bits identifying a memory page and the 12 low order bits identifying the off-set within the memory page. An example of such an addressing scheme is shown in FIG. 4.

TLB 504 translates the 32-bit linear address into a 36-bit physical address with 24 higher order bits indicating the memory page, as shown in FIG. 4, and forwards misses to PMH 501. In response, PMH 501 performs page walking and other well-known page miss handling functions. The MOB 503, incorporated with the teachings of the present invention, controls dispatching, buffers all store and load operations, tracks their progress as they move through execution, and then retires (commits them to permanent architectural state) as appropriate. MOB 503 then causes the retired/committed stores to be executed in due course "background" at the convenience of the memory system.

Additionally, MOB 503 responds to load operations by forwarding buffered data as necessary. When an operation is dispatched and cannot complete due to some address or resource conflict, MOB 503 blocks the operation and stores the dependency information. MOB 503 redispatches block operations when the blocking source is removed. Some memory operations cannot execute speculatively. MOB 503 controls the necessary monitoring and dispatches these non-speculative operations at the correct time. For instance, MOB 503 snoops the source addresses of instructions fetched and generates a single stall signal for the bus controller to stall an instruction fetch whenever the source address instruction being fetched substantially matches any of the addresses of the store destinations of the buffered stored instructions. For more information of the blocking of operations, see U.S. patent application Ser. No. 08/176,804, entitled "Method and Apparatus for Performing Load Operations in a Computer System", filed on Jan. 4, 1994 and assigned to the corporate assignee of the present invention.

The TLB 504 and the PMH 501 are intended to represent a broad category of these elements found in most computer systems. MOB 503 will be described in further detail below with additional references to the remaining figures.

FIG. 6 is a block diagram of one embodiment of the data cache memory of the present invention. Referring to FIG. 6, the data cache memory 206 comprises a physical address buffer (PAB) 600, data tag array 601 and a data array 602 and queue 603. PAB 600 is coupled to receive an input (e.g., the physical address) from the TLB of the MEU and is coupled to produce physical address to tag array 601. Tag array 601 is coupled to receive an input (e.g., either store address or load address) from the MOB of the MEU. Data array 602 is coupled to receive an input from tag array 601 and the store data buffer (SDB) of the MEU, as well as being coupled to the bus controller. In response, data array 602 produces an output to the execution core. Queue 603 is also coupled to tag array 601 and data array 602. Queue 603 is also coupled to receive an input from the MOB as well as the bus controller.

The PAB 600 receives and saves the 24 high order bits of the translated physical addresses from the TLB of the MEU for the store and load operations, and in cooperation with the MOB and MIU, commits them to processor state and executes them as appropriate. Data tag array 601 stores the physical address tags of the data currently being cached in data array 602 and tag matches the accessing physical addresses against the stored physical address tags. Data array 602 receives and stores the data currently being cached and responds to data loads. In one embodiment, data tag array 601 and data array 602 have sufficient capacity for storing 128 sets of 2-way set associative 32-byte cache lines of data and their corresponding address tags. PAB 600, in cooperation with the MOB of the data cache controller, will be discussed in further detail below. TAG array 601 and data array 602 are intended to represent a broad category of these elements found in most computer systems, whose functions and constitutions are well-known and will not be further described.

Queue 603 contains accesses to data cache memory 206 that miss the cache memory and are currently pending on the bus. The entries in queue 603 are also checked where the data cache memory is accessed to determine if the desired data is stored in one of its entries or there is a request for that cache line currently pending on the bus. Queue 603 includes storage locations for temporarily storing the data returned for those pending operations. Queue 603 supplies the data and its tag information to data array 602 and tag array 601 respectively. In one embodiment, the queue 603 includes four entries having a 256 bit width (one cache line).

FIG. 7 is a block diagram of one embodiment of the relevant portions of the MIU of the execution unit of the present invention. Referring to FIG. 7, the MIU 304 comprises a store converter (STC) 700 and a store data buffer (SDB) 701, coupled to each other, such that store converter 700 receives data from the reservation station of the execution unit and sends data to SDB 701. SDB 701 then sends the data onto the data cache memory.

The STC 700 converts the floating point data of the STD operations. The SDB 701 receives and stores the STD operations and in cooperation with the store address buffer (SAB) of the data cache controller, and the PAB of the data cache, retires/commits the STD operations as appropriate, and causes them to be executed. The functions and constitutions of the STC 700 are well-known and will not be further described. SDB 701 and its cooperation with the SAB and PAB, will be described in further detail below.

FIG. 8 is a block diagram of one embodiment of the relevant portions of the memory order buffer (MOB). Referring to FIG. 8, the MOB comprises scheduler 801, load buffer (LB) 807, multiplexer (MUX) 803, block prioritization logic 804, unconditional block 805, array block prioritization 806, store buffer 802, and unknown net block 808. Scheduler 801 is coupled to load buffer 807. Load buffer 807 is coupled to block prioritization 804, store buffer 802 and MUX 803. Block prioritization logic 804 is also coupled to receive an input from the TLB and the data cache memory, unknown net 808, array block prioritization 806 and unconditional block 805. Unknown net 808 and MUX 803 are also coupled to the reservation station via the dispatch bus.

The SAB 802 stores the remaining operands and partial replications of the page denoting portions of the store destination addresses of buffered STA operations. The SAB 802, in cooperation with the SDB of the MIU and the PAB of the data cache memory, retires/commits the STA operations as appropriate, and causes them to be dispatched.

LB 807 also is coupled to receive a copy of the load operations dispatched from the RS via MUX 803. Load operations are copied into LB 803. LB 803 provides the stored load operations to the TLB and the execution pipe upon dispatch. MUX 803 receives loads from load buffer 807 and from the dispatch bus and outputs one for dispatch to memory.

Unknown net 808, unconditional block 805 and array block prioritization 806 determine if a specific set of condition exist that would cause or require a particular load operation to be prevented from executing. Each of these will be described below later. Block prioritization logic 804 receives conflicts/conditions/identification signals to block load and initiate operations stored in LB 807. Block prioritization logic indicates the status of load operations through signals sent to LB 807. Scheduler 801 schedules load operations for dispatch to memory based on their status. For more information on preventing load operation execution using the above referenced units and blocks, see U.S. patent application Ser. No. 08/176,804, entitled "Method and Apparatus For Performing Load Operations in a Computer System", filed on Jan. 4, 1994 and assigned to the corporate assignee of the present invention.

Figure 9:
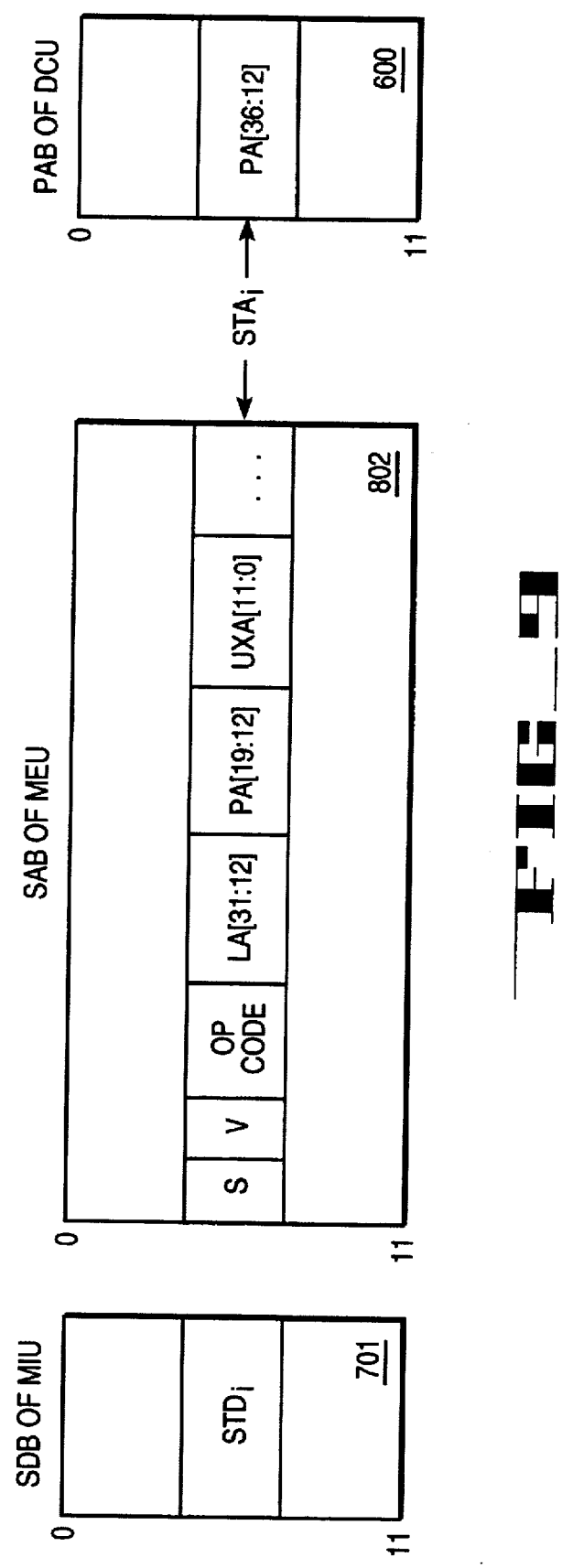
FIG. 9 is a block diagram depicting the interaction between the store address buffer the store data buffer and the physical address buffer.

FIG. 9 is a block diagram of one embodiment of the PAB, the SDB and the SAB. The PAB 600, the SDB 701 and SAB 802 all comprise an equal number of buffer slots. In one embodiment, up to a maximum of 12 buffer slots are included. The STD and STA operations of the store instructions are stored in corresponding buffer slots of the PAB 600, SDB 701 and SAB 802. More specifically, the 24 high order bits of the physical address (PA [36:12]) are stored in the buffer slot in the PAB 600. The STD operation is stored in a corresponding buffer slot and the SDB 701. The STA operation, including the valid bit, the OP code, the 20 high order bits of the linear address (LA [31:12]), and the 12 page offset designating bits of the address (UXA[11:0]), is stored in a corresponding buffer slot in the SAB 802. Additionally, the 8 lower order bits of a page designated portion of the physical address (PA[19:12]) of the STA operation are replicated in the buffer slot in the SAB 802. STA operations of most store operations are promoted to a "senior" state, i.e. ready for retirement or commitment, in due course, when their respective preceding instructions have been retired/committed or promoted to the "senior" state. The "senior" STD and STA operations are then executed in the "background" in due course when the data cache is free and then purged from the SDB 701, the SAB 802 and the PAB 600. The STD and STA operations of some of the store instructions, such as those storing data to memory locations mapped to I/O devices, are not eligible to be promoted to the "senior" state. The store data and store address operations of these store instructions are retired/committed, and purged from the SDB 701, the SAB 802 and the PAB 600 concurrent with their executions. In other words, when the target I/O devices are ready to accept the data being "stored", then the execution occurs. In one embodiment, the linear addresses are driven from the SAB 802 to the TLB again, and the newly generated PA is directly provided to the tag array of the data cache, bypassing the PAB of the data cache memory. Additionally, if a store instruction involves storing data to memory locations spanning two cache lines, the data cache controller signals the data cache memory, and the STD and STA operations are driven to the data cache memory twice, with the data size and the physical address being adjusted accordingly the second time.

Performing Load Operations

In the present invention, a load operation is performed in response to a load instruction. The load instruction is received by the instruction fetch and issue unit which decodes the load instruction. The issue and fetch unit sends the decoded load operation to the reservation station for dispatch to the memory subsystem when any data dependencies that exist between the load operation and other operations are resolved.

Once in the memory subsystem, the linear address for the load can be either bypassed directly from the AGU 505 or can come from the MOB load buffer 807. The upper 20 bits of the linear address are translated by the DTLB into a physical address. The data cache memory 206 uses these physical address bits along with the lower 12 bits of the untranslated address to perform a tag array look-up and data array read (if needed). If the load operation "hits" the cache memory 206, then the data is read out of the data cache memory data array, aligned and then passed on to a load converter (not shown to avoid obscuring the present invention). The load converter then converts the data into the proper internal format recognized by the processor and writes it back on the writeback bus. If the load misses the data cache memory 206, a request for data will be made to the bus controller 204. After the data is retrieved by the bus controller 204, either from an L2 cache memory or external memory, the data cache memory 206 requests a cycle on the writeback bus to return the requested data. When the data cache memory 206 has received a grant for a cycle on the writeback bus, it forwards its data to the load converter which drives it on the writeback bus after format conversion.

When performing load operations in the present invention, the load operation is dispatched for execution to the memory subsystem. Once a load operation has been dispatched, the data cache memory 206 and the DTLB also begin providing a blocking status, while the MOB detects one or more address conflicts. In other words, the present invention provides for determining address and resources conflicts. Note that address and resource dependencies and the conflicts that may arise because of them are generally known in the art.

Using the blocking status condition and the address conflict information, the MOB prioritizes the conditions and conflicts to determine if the load operation should be allowed to continue in execution. If the load cannot be completed due to a conflict, it is halted or blocked. That is, the DCU aborts the load request. In this case, the MOB creates a block code identifying the event that must occur, if any, before the load can be completed. Once the appropriate event has been observed, the load operation may "wake up" and be redispatched for execution.

Once a load has been awakened, there is no guarantee that it will complete during the next execution cycle The load operation may not complete because it may be blocked again for the same or different reasons. For example, a load may be blocked by the MOB on its initial dispatch because of an address conflict with a store operation that has been dispatched previously and is currently pending. When the operation that generates that address is dispatched, the load operation is awakened and redispatched. The redispatched load may be blocked by the data cache memory due to a pending load operation for the same cache line for a different load operation currently executing in the system. When the appropriate data is returned, the load operation will wake up and be redispatched. Once redispatched, the load may block again, or complete with returned data.

The load operations that are blocked are stored in the load buffer. In one embodiment, the load buffer contains sixteen entries. Therefore, at most 16 load operations can be pending in the processor at any one time. As many as 16 load operations may "wake up" in a given cycle. Since only one load is dispatched every cycle (in one embodiment), the MOB must queue the load operations that are awake for dispatch. Queuing is performed by the load buffer by tagging loads as "ready" when they wake up. The load buffer then schedules for dispatch one of the "ready" loads each cycle. This ready/schedule mechanism allows a throughput of one load operation scheduled per cycle.

Thus, the memory of the system is organized such that it receives the load operation dispatched to the memory subsystem one per cycle. The MOB performs multiple load blocking checks during this time to determine if load can be executed without conflicts (since the reservation station dispatches purely on data dependency). Checking for address and resource dependencies, the MOB gathers all the blocking conditions and prioritizes them to determine the highest priority. The load operation is stored and tagged with the block code and prevented from completion if a conflict exists (e.g., it is blocked). The operation of the memory system is monitored to determine when the conditions causing a particular load to be block no longer exist. At this time, the load is allowed to redispatch.

The status of the load operation is written into the load buffer. In one embodiment, the load status may be one of four designations: invalid, valid and completed, valid and blocked, or valid and not blocked. Each load operation gets written into its load buffer with the status and the load buffer uses these status bits to determine when the load operation is to execute in subsequent cycles. If there are no blocks or faults or other similar associated conditions/conflicts, then the load operation is sent to the data cache memory and assigned a load status of valid and completed. It should be noted that this does not necessarily mean that the load operation has been executed. With respect to writing back to the reservation station and ROB, the load operation has not completed (e.g., because there may have been a cache miss). From the MOB's standpoint, however, it is completed and no further action needs to be taken by the MOB. If a fault occurs with respect to the load operation, it is marked as valid and completed. Note that these faults may be indicated by the TLB or an AGU. The load operation as may not have actually happened, but as far as the MOB is concerned the operation has been completed. If a page miss occurs with respect to the load operation, then the load operation is marked invalid. In the case of a page miss, the page miss handler processes the page a page walk and redispatches the load.

The valid and blocked and the valid and not blocked status are a function of multiple conditions and conflict determinations. The MOB, TLB and data cache memory provide the information to determine whether or not the status should be blocked or not. In one embodiment, these different conditions are prioritized to determine when to redispatch a load operation. For more information on load blocking and wake up, see U.S. patent application Ser. No. 08/176,804 entitled, "Method and Apparatus For Performing Load Operations in a Computer System", filed on Jan. 4, 1994 and U.S. application Ser. No. 08/177,164 entitled, "Method and Apparatus For Performing Load Operations in a Computer System", filed Jan. 4, 1994 and assigned to the corporate assignee of the present invention and incorporated herein by reference.

Load Buffer Management

The load buffer contains load operations waiting for execution and stores load operations until they retire (committed to permanent architectural state). They are stored in the load buffer to ensure processor ordering. The load operations are also stored in the load buffer to perform blocking and wake up management and to maintain memory consistency.

The load buffer management of the present invention determines whether each load buffer entry is to wake up or not (e.g., no longer be blocked). In the present invention, all of the load operations that are stored in the load buffer are tested to determine their readiness for dispatch every cycle. During this determination, a ready bit is sent to the scheduler, which prioritizes the ready entries and produces a pointer indicating which of the load buffer entries is to be read out for potential dispatch to the memory subsystem. In response to the pointer, the load buffer management causes the load operation at the particular entry selected by the scheduler to be read out for dispatch.

In a prior implementation, the entry that is read out of the load buffer includes data that is used by an arbitration mechanism as part of a determination of what to dispatch next to memory. The decision to dispatch is made based on data from many sources, including the load operation selected by the scheduler and read out of the load buffer. Arbitration among numerous sources to gain access to the memory subsystem is well-known in the art. Thus, at each cycle, a ready calculation is made to determine the readiness of blocked load operations.

After the ready calculation, the scheduler selects a load operation that is stored in one of the load buffer entries. The results of the scheduling operation is a read operation on the load buffer array to read out the selected entry. Once a load operation has been read from the array, arbitration takes places between multiple sources to select an operation for dispatch to memory. The arbitration decision is made based, in part, on information stored with the load buffer entry being read from the load buffer. This information comprises the valid bit. In this implementation, once the arbitration mechanism has the valid bit, it may perform the arbitration. Thus, the arbitration occurs once the array has been read, i.e. the arbitration is dependent on data read from the array. Likewise, the dispatching operation occurs only after, and is dependent on, the arbitration taking place.

In order to speed up dispatching of an operation to memory, a dependency in the critical path must be modified or eliminated. In the present invention, the arbitration is not dependent on information that is the read from the array when one of the entries is selected. By removing this dependency, the dispatch of an operation occurs earlier in time. It should be noted that in the present invention, the read operation still remains a dependency of the dispatch operation.

The present invention operates on the assumption that if there is at least one load operation ready, then the scheduler selects that valid load operation to dispatch to memory. If one or more load buffer entries are ready to dispatch, the scheduler chooses a valid one. Because of this assumption, the present invention assumes that the valid bit used in the arbitration is available earlier in the form of a function based on the ready signals sent to the scheduler.

In the present invention, the valid, or ready, bits for each of the entries in the load buffer are ORed together to produce an indication (e.g., signal(s)), referred to herein as the array ready signal. The bits are available a phase earlier than the read pointer from the scheduler that selects the load buffer entry for potential dispatch. By taking the ready bit and putting them on a wired-OR bus, a readiness indication signal may be sent to arbitration earlier than when a valid bit of a load buffer entry is received by the arbitration after the entry is read out of the array. In other words, the present invention speeds up dispatch of an operation by calculating the wired-OR of ready functions to set forth the readiness of a load operation in the load buffer to the arbitration earlier than the previously described implementation.

FIGS. 10A and 10B are timing diagrams. Referring to FIG. 10A, in the prior implementation of a dispatch operation, the wake-up operation is initially performed to determine which of the load operation in the load buffer are no longer blocked. At the rising edge of the clock, a ready calculation is performed based on the results of the wake-up operation. The ready calculation determines which of the load buffer entries are ready for scheduling and dispatch. This calculation may be based on valid bits, wake-up codes and IDs, etc. At the following edge of the clock and based on the ready calculation, one of the load operations stored in the load buffer is scheduled by the scheduler. Next, the scheduled entry is read at the rising edge of the next clock pulse based on the completion of the scheduling operation. Arbitration follows in response to the read array operation to select a memory operation for dispatch among multiple sources, one of which is the load buffer. Thereafter, the dispatching operation occurs. As disclosed above, in one embodiment, a MUX is used to dispatch one of multiple memory operations from one of a variety of sources.

In FIG. 10B, a timing diagram illustrating a dispatching operation according to the present invention is depicted. Referring to FIG. 10B, the wake-up operation, ready calculation and scheduling operation are the same as in FIG. 10A. Similarly, the scheduling operation is the same as in FIG. 10A in that it causes the reading of the array at the same time as in the prior implementation. However, at the falling edge of the clock, an array ready signal is generated in response to the ready calculation is used in the arbitration, thereby allowing arbitration to occur earlier. In this manner, the determination of array readiness is taken out of the critical path. Note that in one embodiment, the arbitration operation still begins at the same time; however, signals that would arrive later during the arbitration operation in the prior implementation are available earlier and, thus, allow the dispatch operation to occur earlier.

FIG. 11 illustrates a portion of the load buffer management of the present invention. Referring to FIG. 11, in an exemplary load buffer entry 1100 is shown having a valid bit 1101 and a complete bit 1102 and a block code/wake-up ID 1103 that is responsive to the wake-ups from the system. The other load buffer entries have not been shown to avoid obscuring the invention. A ready signal, such as ready signal 1105 from each entry is sent to scheduler 1100 which asserts a pointer 1109 to one entry to indicate that to that entry that is has been scheduled for reading from the load buffer array and eventual dispatch. The ready signal is based on both the valid and complete bits of an entry indicating that load operation is valid and its execution within the processor has completed, respectively. If both of these conditions are true, a ready signal for the entry will be asserted to scheduler 1108.

As shown, each ready signal 1105 is also coupled to a wired-OR bus 1104 through a pair of transistors. The wired-OR circuitry used in the present invention is well-known in the art. As shown, each ready signal (e.g., valid bit) is coupled to a gate of one of the two transistors while the gate of the other transistor is coupled to a clock (e.g., clock low, or not clock). In one embodiment, only one transistor is used. If any of the ready signals of the load buffer entries is asserted (e.g., high), wired-OR bus 1104 is pulled down, such that the array ready signal 1106 goes low to indicate that at least one entry in the array is valid. If no ready signal is high, the wired-OR bus 1104 remains high. In one embodiment, one or more "ready" indications (e.g., valid bits) pull down the wired-OR bus wherein the array ready signal is generated in parallel to the scheduling to the load operation.

FIG. 12 illustrates one embodiment of the dispatching hardware. Referring to FIG. 12, an arbitration logic 1201 receives various requests from the page mishandler, the reservation station, the cache memory, and the load buffer array and provides dispatch grants to the various sources. One such grant is the dispatch select 1203 that selects from the various sources of the load operations to dispatch to memory. Dispatch select 1203 selects one of multiple entries into multiplexer (MUX) 1204.

One of the inputs to MUX 1204 is from the load buffer array 1202. The data output from array 1202 may be (optionally) latched, such as by latch 1206. In the previous implementation, a valid bit from the data read from the array is used as a request for arbitration. However, in the present invention, the ready array signal 1205 from the array is generated as the request and is sent independently of the valid bit or any other data that is part of the array read. In one embodiment, array ready signal 1205 is latched prior to its receipt by arbitration logic 1201, such as by latch 1207. Note that the array ready signal represents any number of load buffer entries that are to be read out, and that it is assumed that the scheduler will select a valid entry as a result of its scheduling algorithm. That is, if the scheduler has multiple ready entries, the one that is selected by the scheduler will be a valid entry. Note that if the arbitration performed had a function dependent on which entry was read out and the identity of the wake-up sources, the present invention may not function properly in some embodiments.

In sum, the present invention removes a dependency from the critical path of load dispatching, thereby allowing the dispatch of load operations to occur earlier (e.g., one phase earlier).

Whereas many alterations and modifications of the present invention will no doubt become apparent to a person of ordinary skill in the art after having read the foregoing description, it is to be understood that the various embodiments shown and described by way of illustration are in no way intended to be considered limiting. Therefore, references to details of various embodiments are not intended to limit the scope of the claims which in themselves recite only those features regarded as essential to the invention.

Thus, an apparatus for determining readiness of load operations has been described.

We claim:

1. A processor for use in a system, said processor comprising:

a bus;

an issue unit coupled to the bus to issue operations including load operations in response to instructions fetched from memory;

an array coupled to the issue unit having entries to store a predetermined number of load operations prior to dispatch to memory for execution;

an array management mechanism coupled to the array, wherein the array management mechanism determines dispatch readiness of load operations stored in the array prior to reading out one load operation and generates an indication of the dispatch readiness of said one load operation for use in arbitration for dispatch.

2. The processor defined in claim 1 wherein the array management mechanism generates the indication by ORing together a ready indication of each of the predetermined number of load operations.

3. The processor defined in claim 1 array management mechanism further comprises a wired-OR circuit driven by readiness indications associated with each of the predetermined number of load operations.

4. The processor defined in claim 1 wherein readiness of each load operation is based on validity of said each load operation and execution completeness within the processor.

5. A processor for use in a system, said processor comprising:

a bus;

an issue unit coupled to the bus to issue operations including load operations in response to instructions fetched from memory;

an array coupled to the issue unit having entries to store a predetermined number of load operations prior to dispatch to memory for execution;

an array management mechanism coupled to the array, wherein the array management mechanism determines dispatch readiness of load operations stored in the array prior to reading out one load operation and generates an indication of the dispatch readiness of said one load operation;

a scheduler coupled to the array management mechanism to schedule a load operation stored in the array for dispatch to memory for execution, when the scheduler receives readiness indications from each load buffer entry;

an arbitration mechanism arbitrating among a plurality of requests and generating an indication to select one of the plurality of requests for dispatch, wherein the arbitration mechanism generates a select signal indicative of selection; and a dispatch mechanism coupled to the arbitration mechanism and the array having a plurality of sources of operations, wherein the dispatch mechanism dispatches operations from one of the plurality of sources in response to the select signal.

6. The processor defined in claim 5 wherein generation of the array ready signal is performed in parallel with scheduling operation by the scheduler.

7. The processor defined in claim 5 wherein the array management mechanism generates the indication by ORing together a ready indication of each of the predetermined number of load operations.

8. The processor defined in claim 5 array management mechanism further comprises a wired-OR circuit driven by readiness indications associated with each of the predetermined number of load operations.

* * * * *